United States Patent
Yoneyama

(10) Patent No.: US 9,297,986 B2
(45) Date of Patent: Mar. 29, 2016

(54) WIDE ANGLE LENS SYSTEM AND ELECTRONIC APPARATUS HAVING THE SAME

(71) Applicant: SAMSUNG ELECTRONICS CO., LTD., Suwon-si, Gyeonggi-do (KR)

(72) Inventor: Shuji Yoneyama, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/252,999

(22) Filed: Apr. 15, 2014

(65) Prior Publication Data

US 2014/0307332 A1 Oct. 16, 2014

(30) Foreign Application Priority Data

Apr. 16, 2013 (KR) ........................ 10-2013-0041837

(51) Int. Cl.
*G02B 3/02* (2006.01)
*G02B 13/04* (2006.01)
*G02B 13/18* (2006.01)

(52) U.S. Cl.
CPC ................ *G02B 13/04* (2013.01); *G02B 13/18* (2013.01)

(58) Field of Classification Search
USPC ........................................................ 359/708
See application file for complete search history.

(56) References Cited

U.S. PATENT DOCUMENTS

| | | | |
|---|---|---|---|
| 5,000,550 A | 3/1991 | Takahashi et al. | |
| 2001/0028511 A1 | 10/2001 | Sensui | |
| 2003/0067692 A1 | 4/2003 | Sensui | |
| 2006/0227129 A1 | 10/2006 | Peng | |
| 2008/0285159 A1 | 11/2008 | Kobayashi | |
| 2010/0296180 A1 | 11/2010 | Sudoh et al. | |
| 2011/0141579 A1 | 6/2011 | Weng et al. | |
| 2011/0157722 A1 | 6/2011 | Luo | |
| 2011/0164324 A1 | 7/2011 | Okumura | |
| 2012/0127594 A1* | 5/2012 | Yamamoto et al. | 359/708 |
| 2012/0194924 A1 | 8/2012 | Sakai et al. | |
| 2012/0212835 A1* | 8/2012 | Kimata et al. | 359/693 |
| 2012/0268831 A1 | 10/2012 | Yamanashi | |
| 2013/0265653 A1 | 10/2013 | Kimura | |

FOREIGN PATENT DOCUMENTS

| | | |
|---|---|---|
| JP | 02-201310 A | 8/1990 |
| JP | 08-094935 A | 4/1996 |
| JP | 11-231220 A | 8/1999 |

(Continued)

OTHER PUBLICATIONS

Extended European Search Report issued for EP 14163741.3 (Jul. 14, 1024).

*Primary Examiner* — James Jones
(74) *Attorney, Agent, or Firm* — Drinker Biddle & Reath LLP

(57) ABSTRACT

A wide angle lens system and an electronic apparatus including the same are provided. The wide angle lens system includes a first lens group having a negative refractive power, and a second lens group having a positive refractive power. The second lens group is spaced apart from the first lens group by a maximum air gap. The first lens group and the second lens group are sequentially arranged from an object side toward an image side. The second lens group includes a positive 2-1 lens group, a negative 2-2 lens group, and a positive 2-3 lens group, and focusing is performed by moving the 2-2 lens group along an optical axis.

15 Claims, 16 Drawing Sheets

(56) References Cited

FOREIGN PATENT DOCUMENTS

| JP | 2001-228391 A | 8/2001 |
|----|---------------|--------|
| JP | 2003-043350 A | 2/2003 |
| JP | 2004-029641 A | 1/2004 |
| JP | 2005-173275 A | 6/2005 |
| JP | 2008-170720 A | 7/2008 |
| JP | 2010-271669 A | 12/2010 |
| JP | 2011-028009 A | 2/2011 |
| JP | 2011-141364 A | 7/2011 |
| JP | 2011-227124 A | 11/2011 |
| JP | 2011-242520 A | 12/2011 |
| JP | 2012-027450 A | 2/2012 |
| JP | 2012-027451 A | 2/2012 |
| JP | 2012-159613 A | 8/2012 |

* cited by examiner

WIDE ANGLE LENS SYSTEM AND ELECTRONIC APPARATUS HAVING THE SAME

CROSS-REFERENCE TO RELATED PATENT APPLICATION

This application claims the priority benefit of Korean Patent Application No. 10-2013-0041837, filed on Apr. 16, 2013, in the Korean Intellectual Property Office, the disclosure of which is incorporated herein in its entirety by reference.

BACKGROUND

1. Field

The present disclosure relates to a wide angle lens system, and more particularly, to a wide angle lens system including a focus lens group that is lightweight, and an electronic apparatus having the wide angle lens system.

2. Description of the Related Art

Currently, digital cameras or video cameras having a solid state imaging device such as a charge coupled device (CCD) or a complementary metal-oxide semiconductor (CMOS) device are becoming widely popular. In particular, interchangeable-lens cameras are in high demand.

As demand for cameras increases, demand for single focus lenses such as a telephoto lens or a wide angle lens is also increased. A wide angle lens including a so-called retrofocus lens having a long back focal length, a first lens group having negative refractive power, and a second lens group having positive refractive power sequentially arranged from an object side is well known.

The retrofocus lens system may have a long back focal length and a wide viewing angle. However, currently, a so-called auto focusing optical system for performing auto focusing by driving a focus lens group using a motor is used frequently in still cameras and video cameras. In an auto focusing optical system, a focus lens group needs to be lightweight in order to rapidly perform focusing. However, a wide angle lens system may not easily have a large diameter and a lightweight focus lens group at the same time.

SUMMARY

The present disclosure provides a wide angle lens system having a lightweight focus lens group.

The present disclosure also provides an electronic apparatus including a wide angle lens system having a lightweight focus lens group.

According to an embodiment, a wide angle lens system includes a first lens group having a negative refractive power, and a second lens group having a positive refractive power and is spaced apart from the first lens group by a maximum air gap. The first lens group and the second lens group are sequentially arranged from an object side toward an image side. The second lens group includes a positive 2-1 lens group, a negative 2-2 lens group, and a positive 2-3 lens group, and focusing is performed by moving the 2-2 lens group along an optical axis.

An aperture stop may be disposed between the 2-1 lens group and the 2-2 lens group.

The 2-2 lens group may include a doublet lens or a single lens.

The 2-1 lens group may include a lens having at least one aspherical surface.

The 2-3 lens group may include a lens having at least one aspherical surface.

The 2-3 lens group may include a negative lens and a positive lens sequentially arranged from the image side.

The first lens group may include a negative meniscus lens, a positive lens, and a negative lens sequentially arranged from the object side.

The 2-1 lens group may include a positive lens, and a doublet lens having a positive lens and a negative lens.

The wide angle lens system may satisfy the following inequality

<Inequality>

$$-0.20 < f_2/f_{2\text{-}2} < -4.50$$ <Inequality> where $f_2$ denotes a focal length of the second lens group, and $f_{2\text{-}2}$ indicates a focal length of the 2-2 lens group.

The wide angle lens system may satisfy the following inequality $$-0.15 < f/f_1 < -2.10$$ <Inequality> where f denotes a focal length of the wide angle lens system at an infinite object distance, and $f_1$ indicates a focal length of the first lens group.

The wide angle lens system may have an F number equal to or less than 1.8.

According to another embodiment, an electronic apparatus includes a wide angle lens system, and an imaging device that receives light imaged by the wide angle lens system. The wide angle lens system includes a first lens group having negative refractive power, and a second lens group having positive refractive power and is spaced apart from the first lens group by a maximum air gap. The first lens group and the second lens group are sequentially arranged from an object side toward an image side. The second lens group includes a positive 2-1 lens group, a negative 2-2 lens group, and a positive 2-3 lens group, and focusing is performed by moving the 2-2 lens group along an optical axis.

BRIEF DESCRIPTION OF THE DRAWINGS

The above and other features and advantages will become more apparent by describing in detail exemplary embodiments thereof with reference to the attached drawings in which.

DETAILED DESCRIPTION

Figure 1:
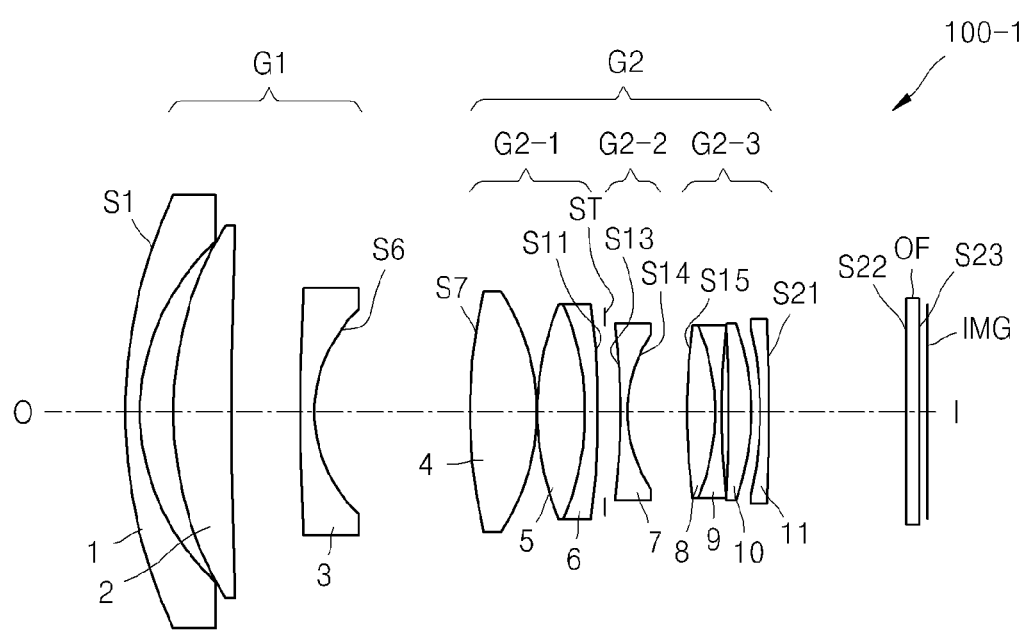
FIG. 1 is a cross-sectional view of a wide angle lens system, according to a first embodiment.

Hereinafter, various embodiments will be described in detail with reference to the attached drawings. In the drawings, like reference numerals denote like elements, and the sizes or thicknesses of elements may be exaggerated for clarity of explanation. The following embodiments are merely provided as examples and various changes in form and details may be made therein.

FIG. 1 is a cross-sectional view of a wide angle lens system 100-1, according to a first embodiment.

The wide angle lens system 100-1 includes a first lens group G1 having a negative refractive power, and a second lens group G2 having a positive refractive power, sequentially arranged from an object side O toward an image side I. The first lens group G1 and the second lens group G2 may be spaced apart from each other by a maximum air gap. Here, the maximum air gap refers to a maximum air gap from among air gaps between lenses in the wide angle lens system 100-1.

The wide angle lens system 100-1 may be a retrofocus type. When the wide angle lens system 100-1 is applied to a video camera or a digital still camera, since a space for disposing, for example, a filter OF is required, a back focal length should be ensured. Although a back focal length may be short in a general large-diameter lens system, the wide angle lens system 100-1 is a large-diameter lens system and may ensure a certain value of back focal length.

The first lens group G1 may include a first negative lens 1, a second positive lens 2, and a third negative lens 3 sequentially arranged from the object side O to the image side I. The first negative lens 1 may be, for example, a meniscus lens, and may have a convex shape toward the object side O.

In order to correct distortion in a retrofocus lens system, a positive lens of the first lens group G1 may be disposed at the nearest position to the object side O. However, if a positive lens is disposed at the nearest position to the object side O, a lens diameter may be increased and thus the size of the lens system may be increased. Accordingly, in order to prevent an increase in the size of the lens system and to correct distortion, the positive lens may be disposed at the second-nearest position to the object side O (the second position nearest to the object side O).

The second lens group G2 may include a 2-1 lens group G2-1 having positive refractive power, a 2-2 lens group G2-2 having negative refractive power, and a 2-3 lens group G2-3 having positive refractive power. The second lens group G2 may perform focusing by moving the 2-2 lens group G2-2 on an optical axis. That is, the 2-2 lens group G2-2 may be a focus lens group.

In order to converge light that has been diverged by the first lens group G1 having negative refractive power, the 2-1 lens group G2-1 may have a relatively strong positive refractive power. Accordingly, in the 2-1 lens group G2-1, a positive lens 4 may be disposed at the nearest position to the object side O and, in order to provide positive refractive power for suppressing, for example, spherical aberration and coma aberration due to the strong positive refractive power, a positive lens 5 may be disposed at the second-nearest position to the object side O. Also, a negative lens 6 may be disposed at the third-nearest position to the object side O, and thus spherical aberration and coma aberration may be corrected. The positive lens 5 and the negative lens 6 may be formed as a doublet lens and thus chromatic aberration may be easily corrected.

An aperture stop ST may be disposed between the 2-1 lens group G2-1 and the 2-2 lens group G2-2. The aperature stop ST may be included in the 2-1 lens group G2-1. Since the aperture stop ST is fixed and does not move with the 2-2 lens group G2-2 during a focusing process, a focus lens group (e.g., the 2-2 lens group G2-2) may be lightweight. Also, the 2-2 lens group G2-2 disposed after the aperture stop ST may have a small diameter, and thus the 2-2 lens group G2-2, which is a focus lens group, may be lightweight.

If the wide angle lens system 100-1 is used in an interchangeable-lens camera, a mounting tool for mounting a lens is required and the mounting tool has a mechanical restriction in terms of diameter. Also, since recent cameras have wiring for transmitting and receiving electrical signals via the mounting tool, a lens near the mounting tool may have a small diameter. By disposing the aperture stop ST between the 2-1 lens group G2-1 and the 2-2 lens group G2-2, a total lens diameter of the second group G2 is not increased. Also, the wide angle lens system 100-1 may be a large-diameter lens system having an F number equal to or less than about 1.8. In this large-diameter lens system, a lens diameter may be easily increased. However, the increase in lens diameter may be prevented by disposing the aperture stop ST between the 2-1 lens group G2-1 and the 2-2 lens group G2-2.

Figure 7:
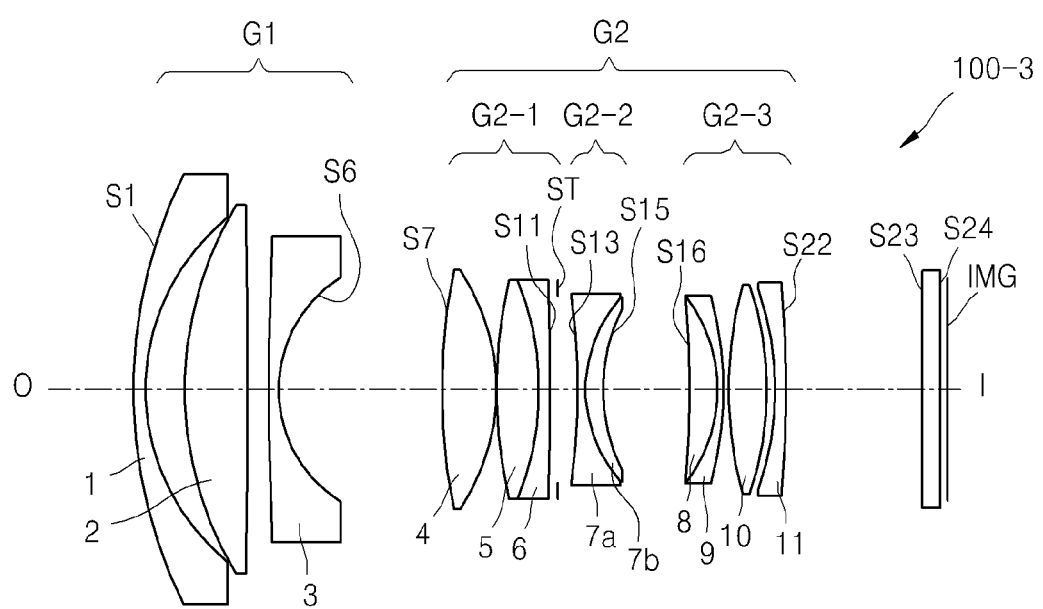
FIG. 7 is a cross-sectional view of a wide angle lens system, according to a third embodiment.

The 2-2 lens group G2-2 may include a doublet lens or a single lens. For example, the 2-2 lens group G2-2 may include a doublet lens having a positive lens and a negative lens. FIG. 7 (third embodiment) and FIG. 10 (fourth embodiment) show that the 2-2 lens group G2-2 includes a doublet lens.

Alternatively, the 2-2 lens group G2-2 may include a single negative lens. FIG. 1 (first embodiment), FIG. 4 (second embodiment), and FIG. 13 (fifth embodiment) show that the 2-2 lens group G2-2 includes a single negative lens 7. As such, due to a small number of lenses, the 2-2 lens group G2-2, which is a focus lens group, may be lightweight. If a focus lens group is lightweight, auto focusing may be performed rapidly, and a driving unit for moving the focus lens group may have a small size and a simple configuration.

The 2-1 lens group G2-1 may include at least one aspherical lens. For example, the 2-1 lens group G2-1 may include the positive lens 4 and a doublet lens having the positive lens 5 and the negative lens 6.

Since the wide angle lens system 100-1 is a large-diameter lens system having an F number equal to or less than about 1.8, the 2-1 lens group G2-1 having a strong positive refractive power and for converging on-axis light diverged by the first lens group G1 having a negative refractive power may have large negative spherical aberration. This spherical aberration may be corrected by disposing at least one aspherical lens in the 2-1 lens group G2-1.

The 2-3 lens group G2-3 may include at least one aspherical surface (e.g., a lens having at least one aspherical surface). The 2-3 lens group G2-3 may include a negative lens 11 and a positive lens 10 sequentially arranged from the image side I. The 2-3 lens group G2-3 may further include two lenses 8 and 9 disposed adjacent to the positive lens 10 toward the object side O. The two lenses 8 and 9 may have an overall positive refractive power, and may be formed as a doublet lens including positive and negative lenses sequentially arranged from the object side O. As such, light diverged by the negative 2-2 lens group G2-2 may be converged, a total diameter of the 2-3 lens group G2-3 may be small, and chromatic aberration may be corrected.

In the wide angle lens system 100-1, field curvature, astigmatism, and distortion due to a wide viewing angle need to be corrected. This aberration may be efficiently corrected by disposing an aspherical surface on a lens having a high incident height of off-axis light and is disposed away from effect of the aperture stop ST. Accordingly, aberration may be corrected by disposing an aspherical lens in the 2-3 lens group G2-3 disposed toward the image side I from the aperture stop ST. In order to correct aberration due to a wide viewing angle, an aspherical lens may also be disposed in the first lens group G1 disposed toward the object side O from the aperture stop ST. However, in this case, in consideration of the position of the aperture stop ST and lens sizes, it is more efficient in terms of manufacturing costs to dispose an aspherical lens in the second lens group G2 that is smaller than the first lens group G1.

By disposing aspherical lenses in the 2-1 lens group G2-1 and the 2-3 lens group G2-3 as described above, aberration of the entire second lens group G2 having a strong positive refractive power may be efficiently corrected. Also, since a burden of correcting aberration of the 2-2 lens group G2-2 (a focus lens group) is relatively reduced, the 2-2 lens group G2-2 may have a small number of lenses.

By disposing the negative lens 11 and the positive lens 10 in the 2-3 lens group G2-3 from the image side I toward the object side O, field curvature and astigmatism due to a viewing angle may be efficiently corrected. Due to a combination of the positive lens 10 and the negative lens 11, aberration may be easily corrected and a telecentric performance may be increased.

The wide angle lens system 100-1 may satisfy Inequality 1 below.

$-0.20 < f_2/f_{2-2} < -4.50$              <Inequality 1>

Here, $f_2$ indicates a focal length of the second lens group G2, and $f_{2-2}$ indicates a focal length of the 2-2 lens group G2-2.

Inequality 1 relates to the refractive power of the 2-2 lens group G2-2 in the second lens group G2. If $f_2/f_{2-2}$ is less than the lower limit of Inequality 1, negative refractive power of the 2-2 lens group G2-2 may be reduced, and thus movement of a focus lens group when focusing is performed with respect to a short-distance object may be increased, and the wide angle lens system 100-1 may have a large size.

If $f_2/f_{2-2}$ is greater than the upper limit of Inequality 1, negative refractive power of the 2-2 lens group G2-2 may be increased, and thus movement of the focus lens group when focusing is performed may be reduced. However, since positive spherical aberration of the 2-2 lens group G2-2 is increased, an aberration variation of the entire wide angle lens system 100-1 according to focusing may be increased, and optical performance from an infinite distance to a short distance may not be easily maintained.

The wide angle lens system 100-1 may satisfy Inequality 2 below.

$-0.15 < f/f_1 < -2.10$              <Inequality 2>

Here, f indicates a focal length of the wide angle lens system 100-1 at an infinite object distance, and $f_1$ indicates a focal length of the first lens group G1.

Inequality 2 relates to the refractive power of the first lens group G1. If $f/f_1$ is less than the lower limit of Inequality 2, negative refractive power of the first lens group G1 may be reduced, and a back focal length for disposing, for example, the filter OF, may be reduced.

If $f/f_1$ is greater than the upper limit of Inequality 2, negative refractive power of the first lens group G1 may be increased, and a back focal length may be increased. However, aberration, for example, positive spherical aberration, of the first lens group G1 may be increased, and aberration of the entire wide angle lens system 100-1 may not be appropriately corrected.

Since a focus lens group may be lightweight, the wide angle lens system 100-1 may have a large diameter appropriate for auto focusing. This wide angle lens system 100-1 may be appropriately used in still cameras, video cameras, and other electronic devices having image capturing capabilities.

An aspherical surface used in the wide angle lens system 100-1 is defined as described below.

When an optical axis direction is an x-axis direction, a direction perpendicular to the optical axis direction is a y-axis direction, and a light proceeding direction is a positive direction, an aspherical surface may be represented as shown in Equation 3 below. Here, x indicates a distance from a vertex of a lens in an optical axis direction, y indicates a distance in a direction perpendicular to the optical axis direction, K indicates a conic constant, a, b, c, and d indicate aspherical coefficients, and C indicates a reciprocal of a radius of curvature at a vertex of a lens (1/R).

$$x = \frac{Cy^2}{1 + \sqrt{1 - (K+1)C^2 y^2}} + ay^4 + by^6 + cy^8 + dy^{10} \quad \text{<Equation 3>}$$

Various embodiments implement wide angle lens systems based on various designs. In the following description, EFL indicates a total (effective) focal length in units of millimeters (mm), FNO indicates an F number, and w indicates a half viewing angle in units of degrees. R indicates a radius of curvature, TH indicates a lens thickness or a distance between lenses, Nd indicates a refractive index, and Vd indicates an Abbe number. In each embodiment, at least one filter OF may be disposed at the nearest position to the image side I. The filter OF may include one of, for example, a low pass filter, an infrared (IR) cut-off filter, and a cover glass. However, the filter OF need not be included in some embodiments. In the drawing, IMG indicates an image surface.

<First Embodiment>

FIG. 1 is a cross-sectional view of the wide angle lens system 100-1, according to the first embodiment. Table 1 shows design data of the first embodiment. Lens surfaces are numbered sequentially from the object side O toward the image side I. Only some lens surfaces of lenses are shown in FIG. 1 and this principle is also applied to the other drawings according to other embodiments.

EFL=24.624, FNO=1.44, and w=30.6°

TABLE 1

| Lens Surface | R | TH | Nd | Vd |
|---|---|---|---|---|
| S1 | 68.415 | 2.000 | 1.66449 | 59.4 |
| S2 | 32.371 | 4.837 | 1.00000 | 0.0 |
| S3 | 47.368 | 8.251 | 1.84666 | 24.9 |
| S4 | 715.880 | 10.346 | 1.00000 | 0.0 |
| S5 | 265.820 | 1.600 | 1.72973 | 39.9 |
| S6 | 18.189 | 22.598 | 1.00000 | 0.0 |
| S7 | 52.023 | 9.306 | 1.60602 | 60.4 |
| S8 | −29.730 | 0.100 | 1.00000 | 0.0 |
| S9 | 34.280 | 7.205 | 1.59282 | 72.1 |
| S10 | −34.370 | 1.600 | 1.92286 | 21.8 |
| S11 | −118.494 | 1.034 | 1.00000 | 0.0 |
| S12(ST) | Infinity | 2.282 | 1.00000 | 0.0 |
| S13 | −105.576 | 1.200 | 1.55740 | 46.0 |
| S14 | 19.000 | 8.520 | 1.00000 | 0.0 |
| S15 | 97.418 | 4.000 | 1.91000 | 39.7 |
| S16 | −27.715 | 1.000 | 1.58739 | 40.6 |
| S17 | 145.198 | 0.786 | 1.00000 | 0.0 |
| S18 | −294.421 | 3.448 | 1.80470 | 42.9 |
| S19 | −31.677 | 1.091 | 1.00000 | 0.0 |
| S20 | −58.249 | 1.400 | 1.61011 | 39.0 |
| S21 | −234.115 | 19.704 | 1.00000 | 0.0 |
| S22 | Infinity | 2.000 | 1.51680 | 67.5(Filter) |
| S23 | Infinity | 0.500 | 1.00000 | 0.0 |

Table 2 shows aspherical coefficients in the first embodiment.

TABLE 2

| Lens Surface | K | a | b |
|---|---|---|---|
| S7 | −1.0000 | −5.87431e−006 | 0.00000e+000 |
| S18 | −1.0000 | −8.36614e−006 | 1.96736e−008 |

Table 3 shows variable distances between lenses when focusing is performed at the shortest distance in the first embodiment.

TABLE 3

| | |
|---|---|
| MAG | 0.2453 |
| TH(S0) | 70.218 |
| TH(S12) | 6.831 |
| TH(S14) | 3.971 |
| TH(S21) | 19.712 |
| TH(S23) | 0.500 |

In Table 3, MAG indicates a magnification of the wide angle lens system 100-1 at the shortest distance, and TH(S0) indicates a distance from an object to an object side surface of a first lens.

Table 4 shows the focal length $f_1$ of the first lens group G1, the focal length $f_2$ of the second lens group G2, and the focal length $f_{2-2}$ of the 2-2 lens group G2-2 in the first embodiment, which are values used in Inequalities 1 and 2.

TABLE 4

| | |
|---|---|
| $f_1$ | −36.087 |
| $f_2$ | 30.073 |
| $f_{2-2}$ | −28.789 |
| $f_2/f_{2-2}$ | −1.045 |
| $f/f_1$ | −0.682 |

Figure 2:
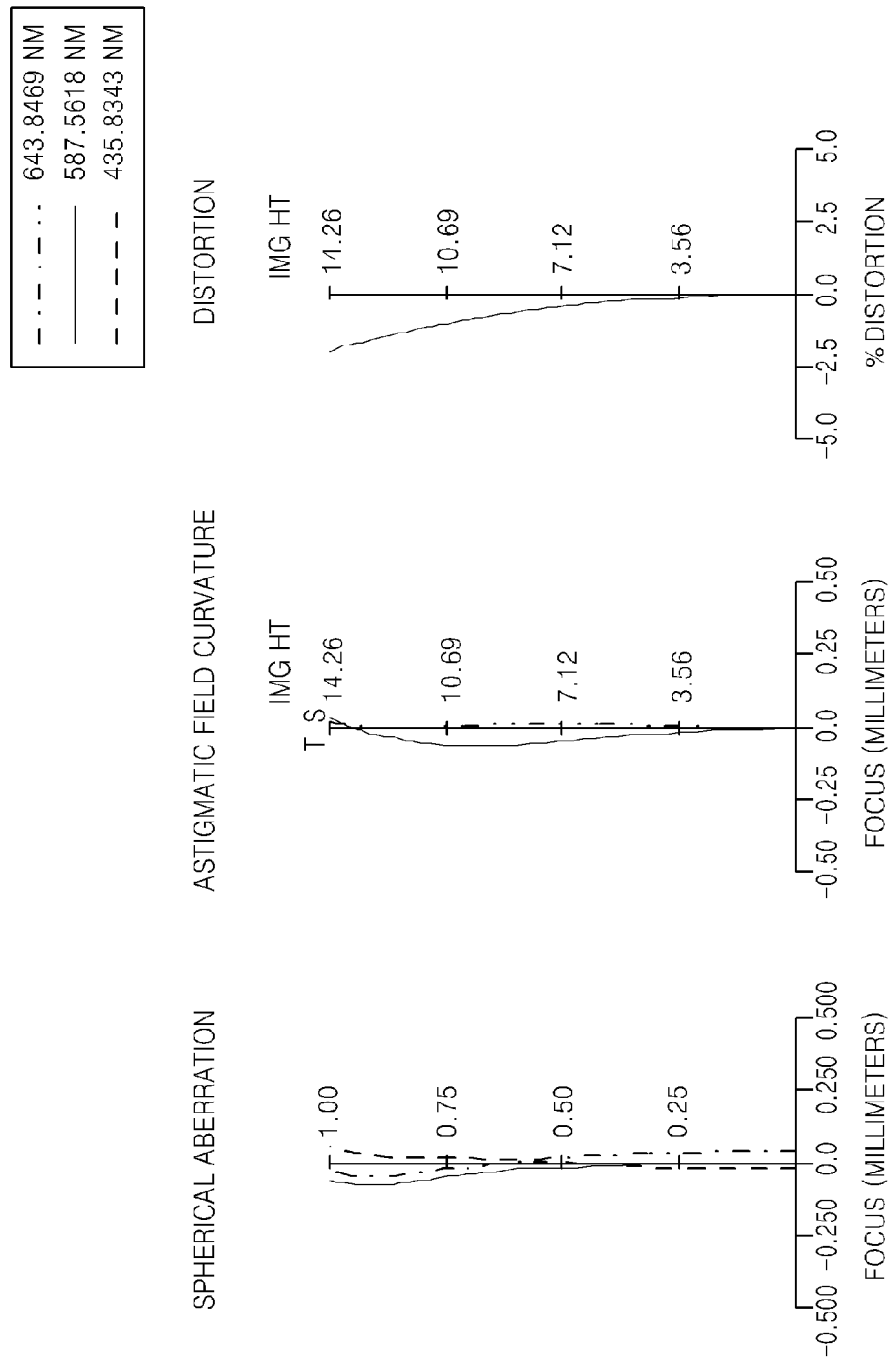
FIG. 2 shows longitudinal aberration graphs of the wide angle lens system of FIG. 1 at an infinite object distance, according to the first embodiment.
Figure 3:
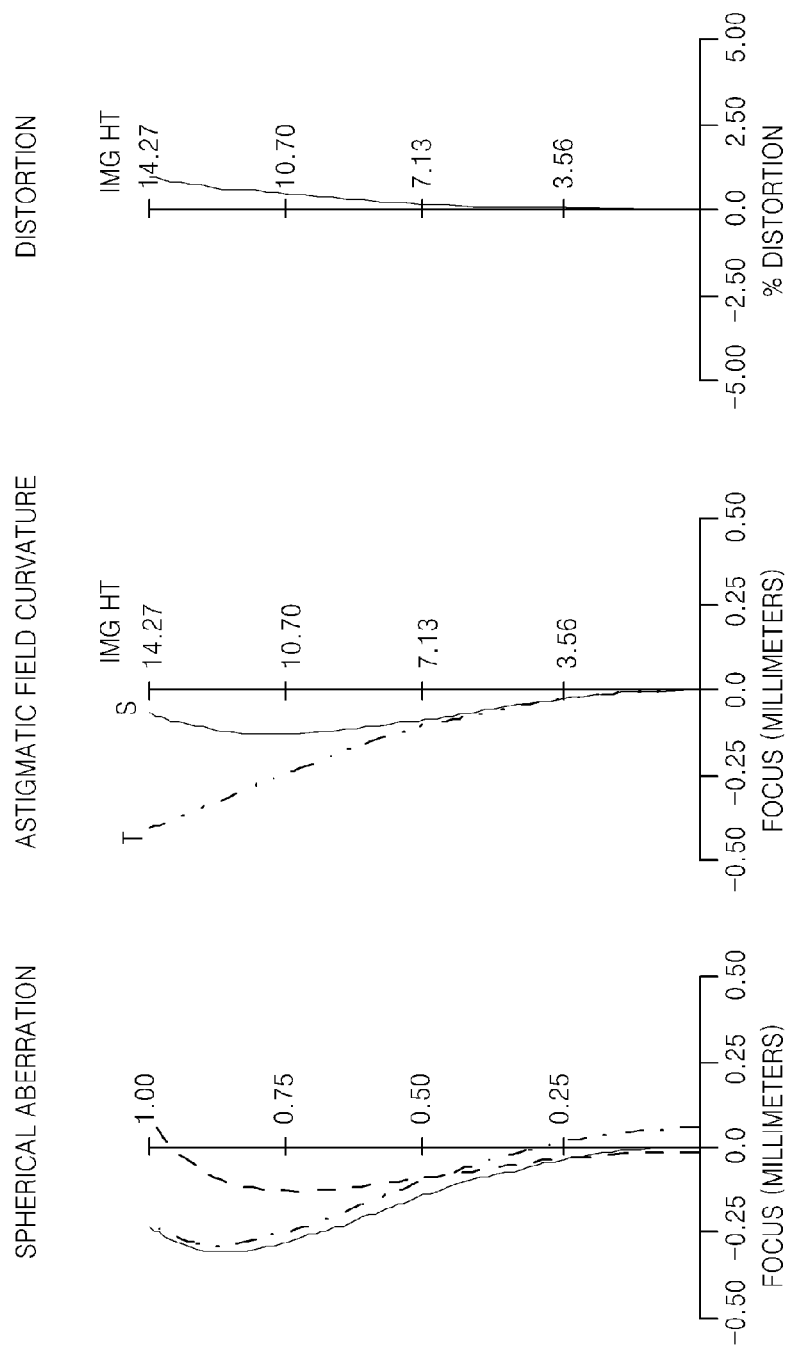
FIG. 3 shows longitudinal aberration graphs of the wide angle lens system of FIG. 1 at a short distance, according to the first embodiment.

FIG. 2 shows longitudinal spherical aberration, astigmatic field curvature, and distortion of the wide angle lens system 100-1 at an infinite object distance, according to the first embodiment. Field curvature includes tangential field curvature (T) and sagittal field curvature (S). FIG. 3 shows spherical aberration, field curvature, and distortion of the wide angle lens system 100-1 at a short distance, according to the first embodiment.

<Second Embodiment>

Figure 4:
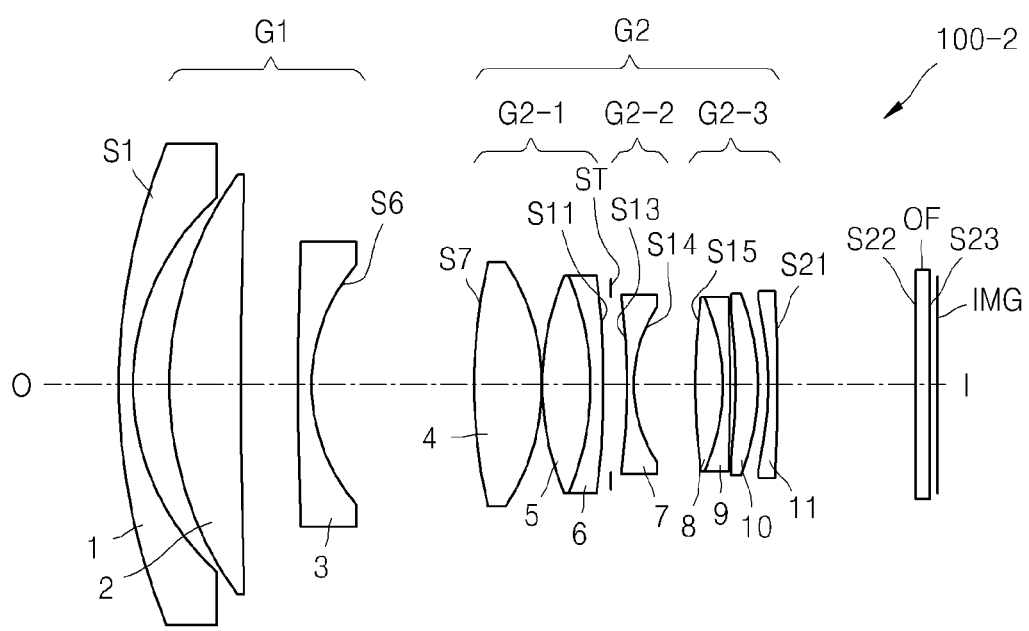
FIG. 4 is a cross-sectional view of a wide angle lens system, according to a second embodiment.

FIG. 4 is a cross-sectional view of a wide angle lens system 100-2, according to a second embodiment. Table 5 shows design data of the second embodiment.

EFL=24,617, FNO=1.44, and w=30.6°

TABLE 5

| Lens Surface | R | TH | Nd | Vd |
|---|---|---|---|---|
| S1 | 72.886 | 2.000 | 1.69680 | 58.3 |
| S2 | 32.930 | 4.604 | 1.00000 | 0.0 |
| S3 | 43.554 | 10.084 | 1.84666 | 24.9 |
| S4 | 806.677 | 8.768 | 1.00000 | 0.0 |
| S5 | 523.269 | 1.600 | 1.74950 | 36.7 |
| S6 | 18.410 | 22.989 | 1.00000 | 0.0 |
| S7 | 56.729 | 9.500 | 1.60602 | 60.4 |
| S8 | −29.717 | 0.100 | 1.00000 | 0.0 |
| S9 | 32.770 | 7.468 | 1.59240 | 71.8 |
| S10 | −34.308 | 1.600 | 1.92286 | 21.8 |
| S11 | −119.502 | 1.027 | 1.00000 | 0.0 |
| S12(ST) | Infinity | 2.303 | 1.00000 | 0.0 |
| S13 | −104.307 | 1.200 | 1.54814 | 48.1 |
| S14 | 19.138 | 8.697 | 1.00000 | 0.0 |
| S15 | 129.488 | 4.000 | 1.91082 | 37.0 |
| S16 | −26.739 | 1.000 | 1.59551 | 41.1 |
| S17 | −289.187 | 0.786 | 1.00000 | 0.0 |
| S18 | −145.047 | 3.335 | 1.80470 | 42.9 |
| S19 | −30.395 | 1.115 | 1.00000 | 0.0 |
| S20 | −59.932 | 1.400 | 1.76182 | 27.9 |
| S21 | −502.406 | 19.182 | 1.00000 | 0.0 |
| S22 | Infinity | 2.800 | 1.51680 | 67.5(Filter) |
| S23 | Infinity | 0.500 | 1.00000 | 0.0 |

Table 6 shows aspherical coefficients in the second embodiment.

TABLE 6

| Lens Surface | K | a | b |
|---|---|---|---|
| S7 | −1.0000 | −5.56187e−006 | 0.00000e+000 |
| S18 | −1.0000 | −1.00959e−005 | 1.90096e−008 |

Table 7 shows variable distances between lenses when focusing is performed at the shortest distance in the second embodiment.

TABLE 7

| | |
|---|---|
| MAG | 0.2459 |
| TH(S0) | 70.000 |
| TH(S12) | 6.852 |
| TH(S14) | 4.148 |
| TH(S21) | 19.190 |
| TH(S23) | 0.500 |

Table 8 shows the focal length $f_1$ of the first lens group G1, the focal length $f_2$ of the second lens group G2, and the focal length $f_{2-2}$ of the 2-2 lens group G2-2 in the second embodiment, which are values used in Inequalities 1 and 2.

TABLE 8

| | |
|---|---|
| $f_2$ | 30.001 |
| $f_{2-2}$ | −29.400 |
| $f_2/f_{2-2}$ | −1.020 |
| $f_1$ | −35.568 |
| $f/f_1$ | −0.692 |

Figure 5:
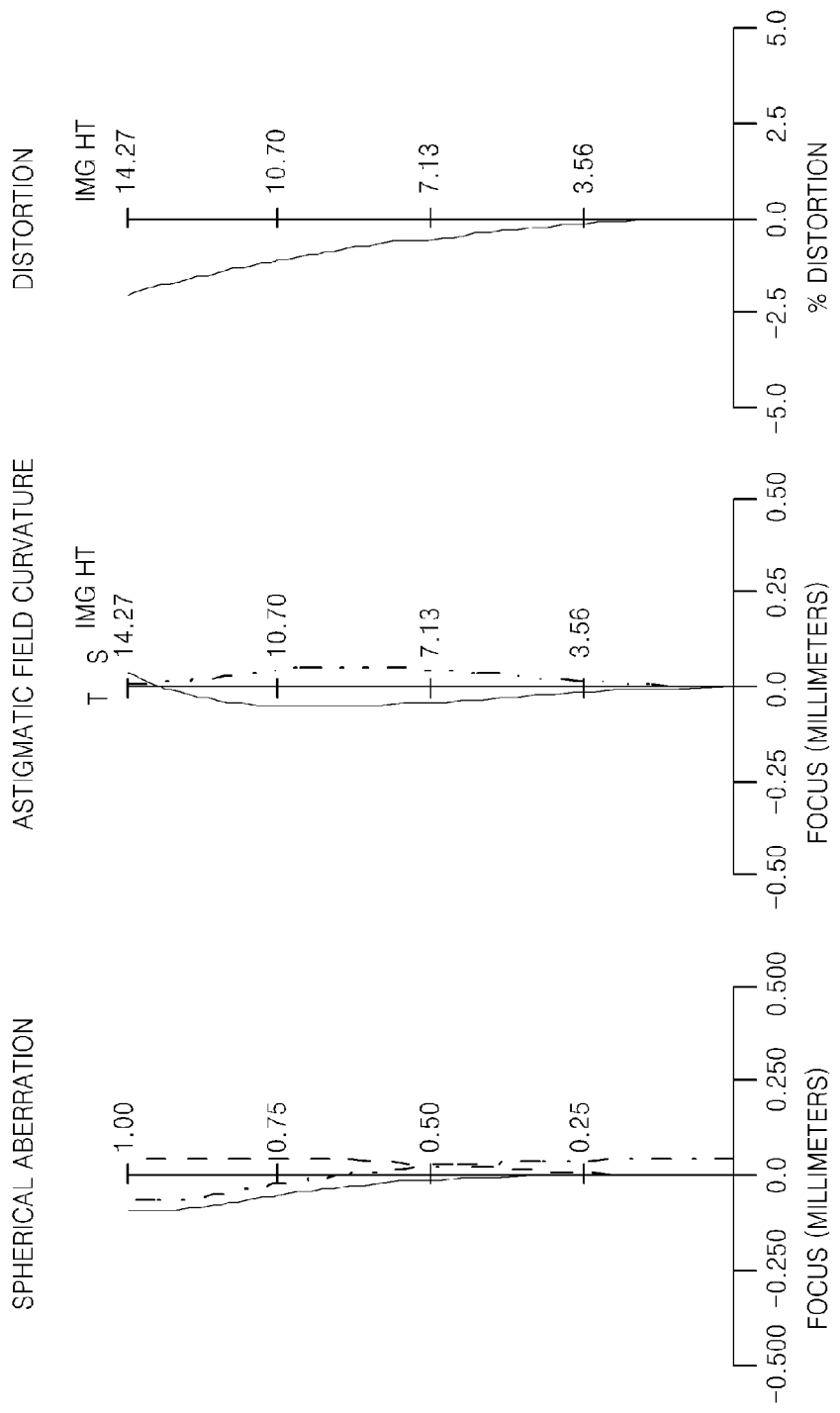
FIG. 5 shows longitudinal aberration graphs of the wide angle lens system of FIG. 4 at an infinite object distance, according to the second embodiment.
Figure 6:
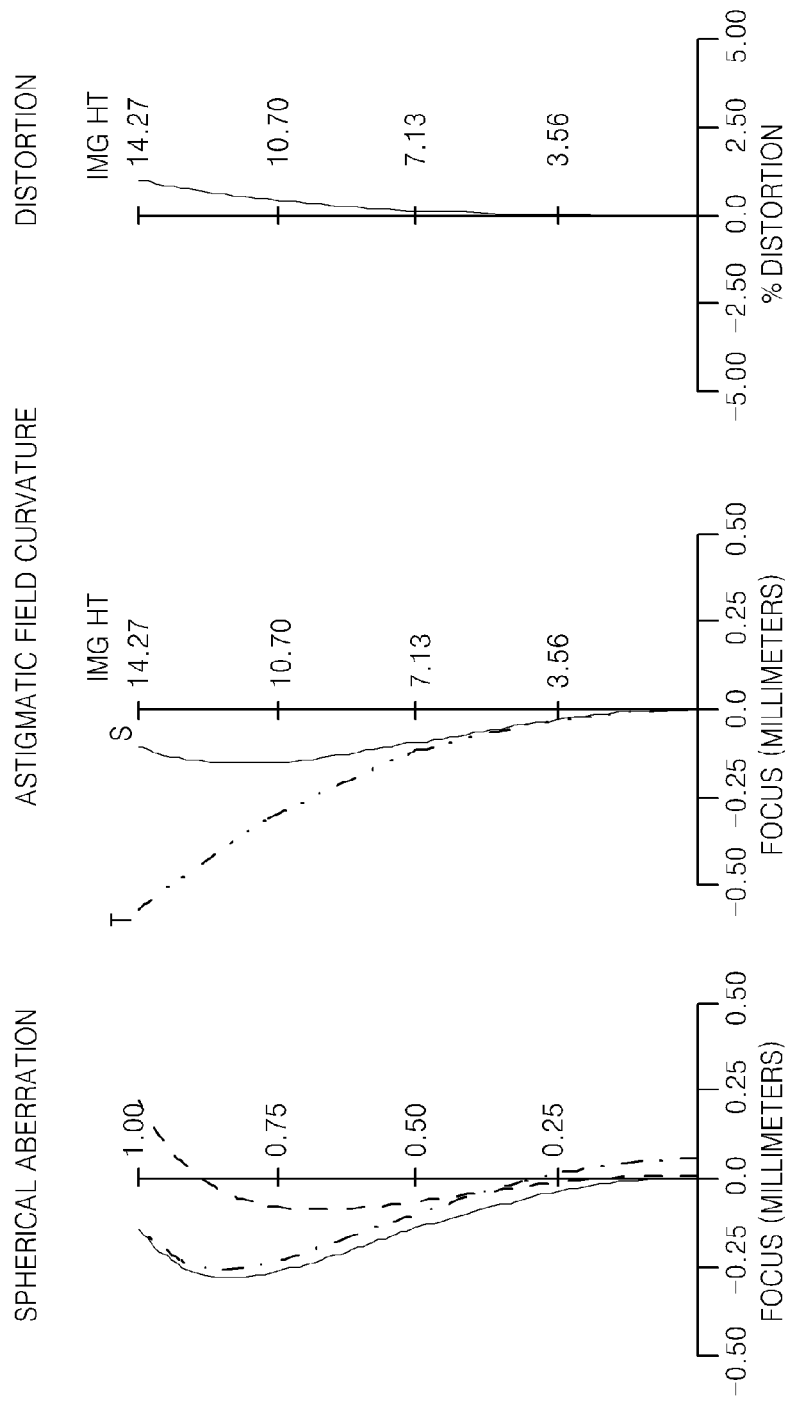
FIG. 6 shows longitudinal aberration graphs of the wide angle lens system of FIG. 4 at a short distance, according to the second embodiment.

FIG. 5 shows longitudinal spherical aberration, field curvature, and distortion of the wide angle lens system 100-2 at an infinite object distance, according to the second embodiment. FIG. 6 shows longitudinal spherical aberration, field curvature, and distortion of the wide angle lens system 100-2 at a short distance, according to the second embodiment.

<Third Embodiment>

FIG. 7 is a cross-sectional view of a wide angle lens system 100-3, according to a third embodiment. Table 9 shows design data of the third embodiment. In the wide angle lens system 100-3, the first lens group G1 includes a negative lens 1, a positive lens 2, and a negative lens 3, the 2-1 lens group G2-1 includes a positive lens 4, a positive lens 5, and a negative lens 6, and the 2-2 lens group G2-2 includes a doublet lens having a negative lens 7a and a positive lens 7b. The 2-3 lens group G2-3 includes a doublet lens 8 and 9, a positive lens 10, and a negative lens 11.

EFL=24.523, FNO=1.44, and w=30.7°

TABLE 9

| Lens Surface | R | TH | Nd | Vd |
|---|---|---|---|---|
| S1 | 58.333 | 2.000 | 1.64769 | 35.5 |
| S2 | 27.909 | 5.628 | 1.00000 | 0.0 |
| S3 | 42.434 | 8.852 | 1.84666 | 24.9 |
| S4 | -701.831 | 2.502 | 1.00000 | 0.0 |
| S5 | 334.980 | 1.600 | 1.60562 | 45.9 |
| S6 | 16.749 | 23.071 | 1.00000 | 0.0 |
| S7 | 56.140 | 7.940 | 1.48463 | 73.5 |
| S8 | -25.056 | 0.100 | 1.00000 | 0.0 |
| S9 | 65.440 | 5.640 | 1.80420 | 48.8 |
| S10 | -35.241 | 1.600 | 1.92286 | 21.8 |
| S11 | -248.309 | 1.389 | 1.00000 | 0.0 |
| S12(ST) | Infinity | 2.574 | 1.00000 | 0.0 |
| S13 | -72.852 | 1.100 | 1.53172 | 51.3 |
| S14 | 16.935 | 2.314 | 1.92286 | 21.8 |
| S15 | 20.253 | 12.326 | 1.00000 | 0.0 |
| S16 | -96.819 | 4.000 | 1.80420 | 48.8 |
| S17 | -19.298 | 1.000 | 1.80518 | 26.6 |
| S18 | -41.687 | 0.786 | 1.00000 | 0.0 |
| S19 | 55.157 | 5.290 | 1.83481 | 44.8 |
| S20 | -38.920 | 1.069 | 1.00000 | 0.0 |
| S21 | -35.622 | 1.400 | 1.68893 | 32.6 |
| S22 | -181.378 | 19.176 | 1.00000 | 0.0 |
| S23 | Infinity | 2.800 | 1.51680 | 67.5(Filter) |
| S24 | Infinity | 0.500 | 1.00000 | 0.0 |

Table 10 shows aspherical coefficients in the third embodiment.

TABLE 10

| Lens Surface | K | a |
|---|---|---|
| S7 | -1.0000 | -8.12036e-006 |

Table 11 shows variable distances between lenses when focusing is performed at the shortest distance in the third embodiment.

TABLE 11

| MAG | 0.2731 |
|---|---|
| TH(S0) | 70.000 |
| TH(S12) | 10.157 |
| TH(S15) | 4.742 |
| TH(S22) | 19.183 |
| TH(S24) | 0.500 |

Table 12 shows the focal length $f_1$ of the first lens group G1, the focal length $f_2$ of the second lens group G2, and the focal length $f_{2-2}$ of the 2-2 lens group G2-2 in the third embodiment, which are values used in Inequalities 1 and 2.

TABLE 12

| $f_1$ | -43.706 |
|---|---|
| $f_2$ | 20.449 |
| $f_{2-2}$ | -34.467 |
| $f_2/f_{2-2}$ | -0.593 |
| $f/f_1$ | -0.561 |

Figure 8:
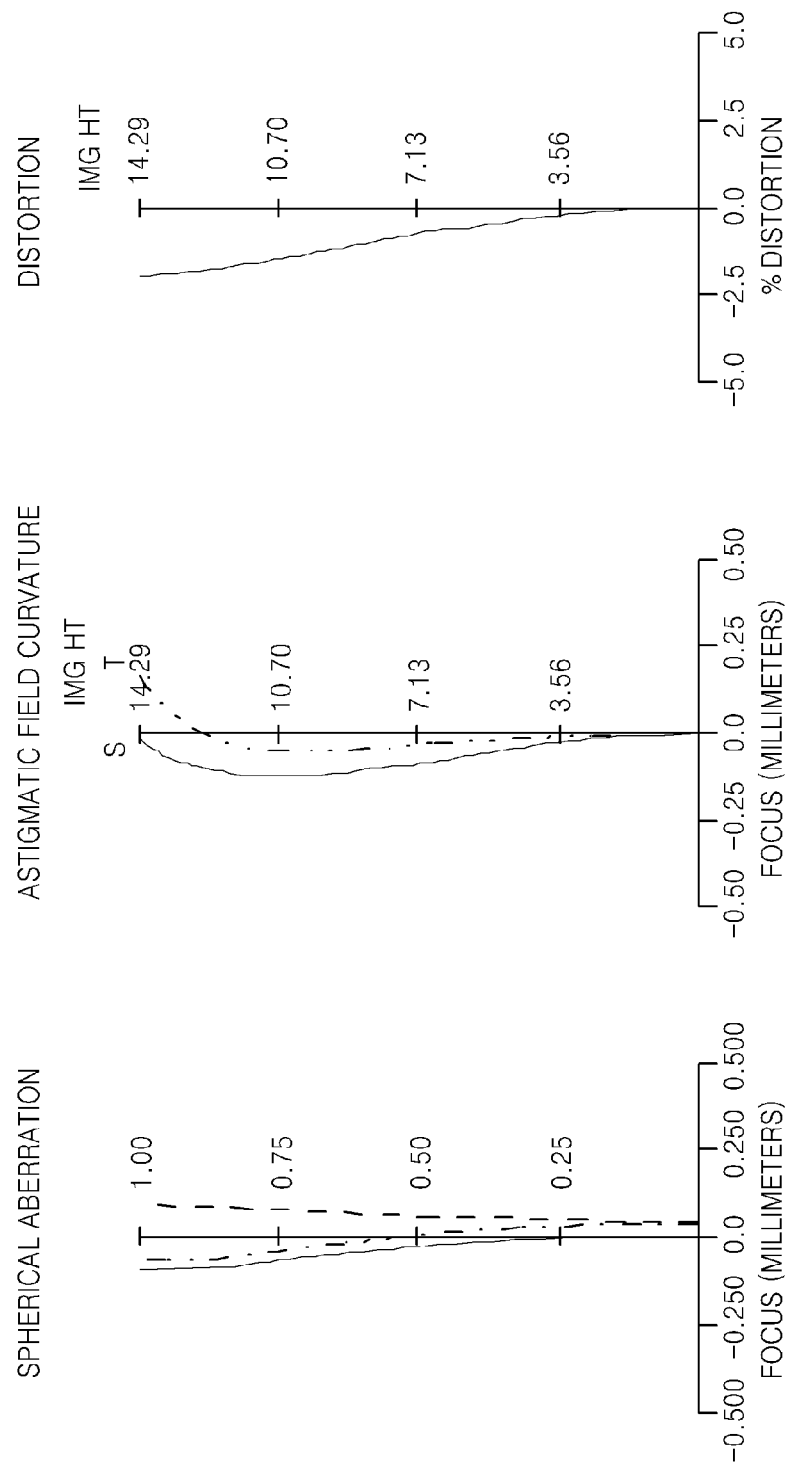
FIG. 8 shows longitudinal aberration graphs of the wide angle lens system of FIG. 7 at an infinite object distance, according to the third embodiment.
Figure 9:
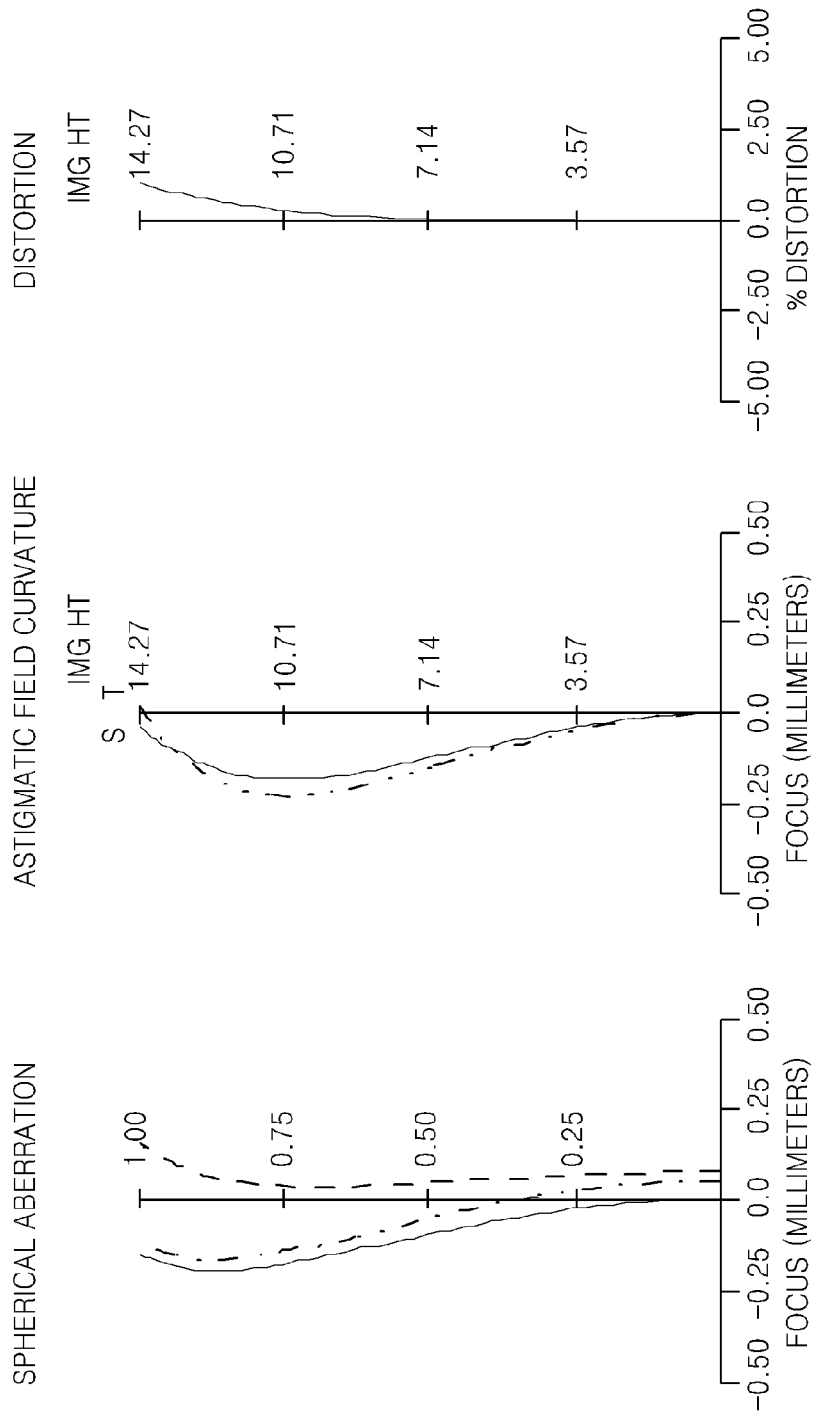
FIG. 9 shows longitudinal aberration graphs of the wide angle lens system of FIG. 7 at a short distance, according to the third embodiment.

FIG. 8 shows longitudinal spherical aberration, field curvature, and distortion of the wide angle lens system 100-3 at an infinite object distance, according to the third embodiment. FIG. 9 shows longitudinal aberration graphs of the wide angle lens system 100-3 at a short distance, according to the third embodiment.

<Fourth Embodiment>

Figure 10:
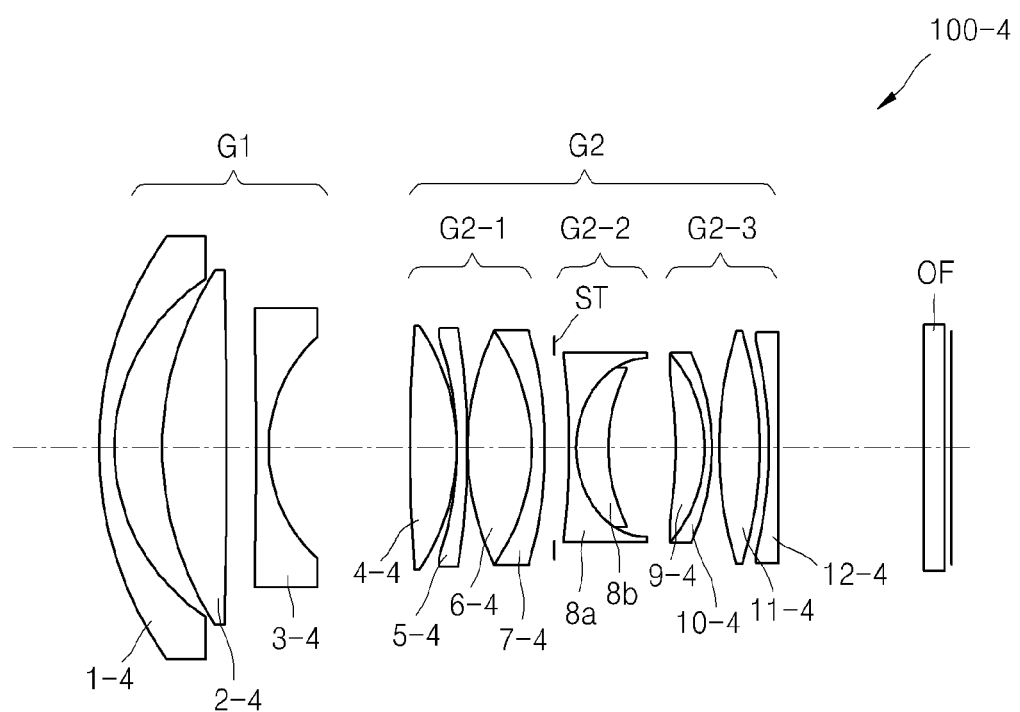
FIG. 10 is a cross-sectional view of a wide angle lens system, according to a fourth embodiment.

FIG. 10 is a cross-sectional view of a wide angle lens system 100-4, according to a fourth embodiment. Table 13 shows design data of the fourth embodiment. In the wide angle lens system 100-4, the first lens group G1 includes a negative lens 1-4, a positive lens 2-4, and a negative lens 3-4. The 2-1 lens group G2-1 includes four lenses 4-4, 5-4, 6-4, and 7-4. For example, the 2-1 lens group G2-1 may include a positive lens 4-4, a negative lens 5-4, a positive lens 6-4, and a negative lens 7-4. However, the 2-1 lens group G2-1 is not limited thereto and the lens arrangement based on the refractive power thereof may be variously changed. The 2-2 lens group G2-2 includes a doublet lens having a negative lens 8a and a positive lens 8b. The 2-3 lens group G2-3 includes a doublet lens 9 and 10, a positive lens 11-4, and a negative lens 12-4.

EFL=24.521, FNO=1.44, and w=30.7°

TABLE 13

| Lens Surface | R | TH | Nd | Vd |
|---|---|---|---|---|
| S1 | 43.624 | 2.000 | 1.65682 | 55.2 |
| S2 | 24.213 | 6.259 | 1.00000 | 0.0 |
| S3 | 37.398 | 8.809 | 1.84700 | 23.8 |
| S4 | -487.325 | 3.646 | 1.00000 | 0.0 |
| S5 | -821.231 | 1.500 | 1.79055 | 31.6 |
| S6 | 17.404 | 18.620 | 1.00000 | 0.0 |
| S7 | 204.750 | 6.135 | 1.79012 | 47.1 |
| S8 | -27.302 | 0.100 | 1.00000 | 0.0 |
| S9 | -46.309 | 1.500 | 1.84700 | 23.8 |
| S10 | -81.619 | 0.100 | 1.00000 | 0.0 |
| S11 | 30.495 | 8.358 | 1.62314 | 58.4 |
| S12 | -24.391 | 1.700 | 1.90000 | 22.5 |
| S13 | -48.099 | 1.000 | 1.00000 | 0.0 |
| S14(ST) | Infinity | 2.000 | 1.00000 | 0.0 |
| S15 | -128.510 | 1.000 | 1.87031 | 33.1 |
| S16 | 11.243 | 4.324 | 1.90000 | 22.5 |
| S17 | 21.362 | 9.036 | 1.00000 | 0.0 |
| S18 | -45.246 | 3.607 | 1.77272 | 53.4 |
| S19 | -17.199 | 1.000 | 1.81257 | 24.8 |
| S20 | -26.012 | 0.786 | 1.00000 | 0.0 |
| S21 | 47.411 | 5.401 | 1.83294 | 43.4 |
| S22 | -48.202 | 1.054 | 1.00000 | 0.0 |
| S23 | -62.902 | 1.400 | 1.71018 | 28.9 |
| S24 | -1072.646 | 19.165 | 1.00000 | 0.0 |
| S25 | Infinity | 2.800 | 1.51680 | 64.2(Filter) |
| S26 | Infinity | 0.500 | 1.00000 | 0.0 |

Table 14 shows aspherical coefficients in the fourth embodiment.

TABLE 14

| Lens Surface | K | a |
|---|---|---|
| S11 | -1.0000 | -2.70034e-007 |
| S21 | -1.0000 | 6.06841e-007 |

Table 15 shows variable distances between lenses when focusing is performed at the shortest distance in the fourth embodiment.

TABLE 15

| MAG | 0.2702 |
|---|---|
| TH(S0) | 70.000 |
| TH(S14) | 6.307 |
| TH(S17) | 4.729 |
| TH(S24) | 19.185 |
| TH(S26) | 0.500 |

Table 16 shows the focal length $f_1$ of the first lens group G1, the focal length $f_2$ of the second lens group G2, and the focal length $f_{2\text{-}2}$ of the 2-2 lens group G2-2 in the fourth embodiment, which are values used in Inequalities 1 and 2.

TABLE 16

| $f_1$ | −34.153 |
|---|---|
| $f_2$ | 32.821 |
| $f_{2\text{-}2}$ | −21.368 |
| $f_2/f_{2\text{-}2}$ | −1.536 |
| $f/f_1$ | −0.718 |

Figure 11:
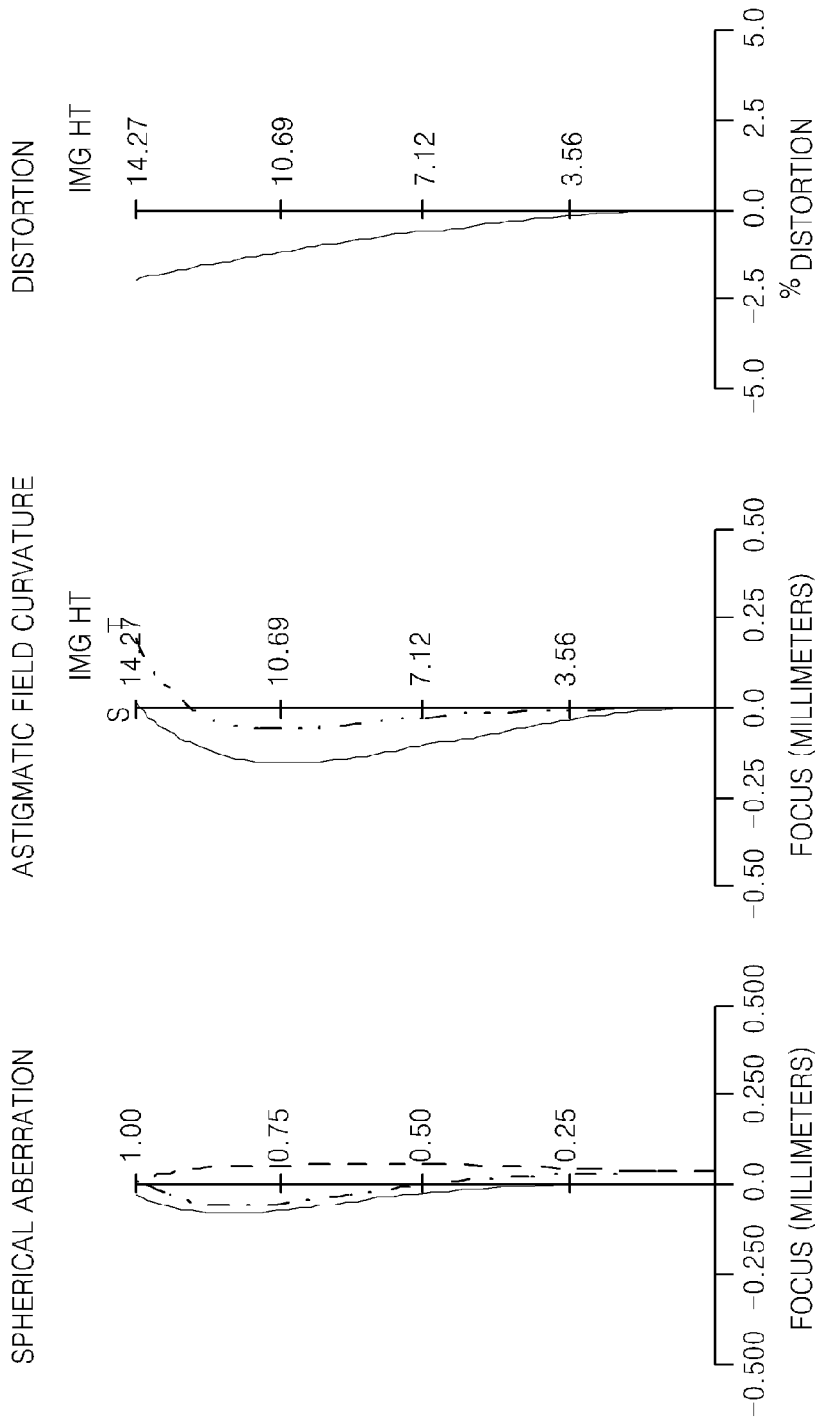
FIG. 11 shows longitudinal aberration graphs of the wide angle lens system of FIG. 10 at an infinite object distance, according to the fourth embodiment.
Figure 12:
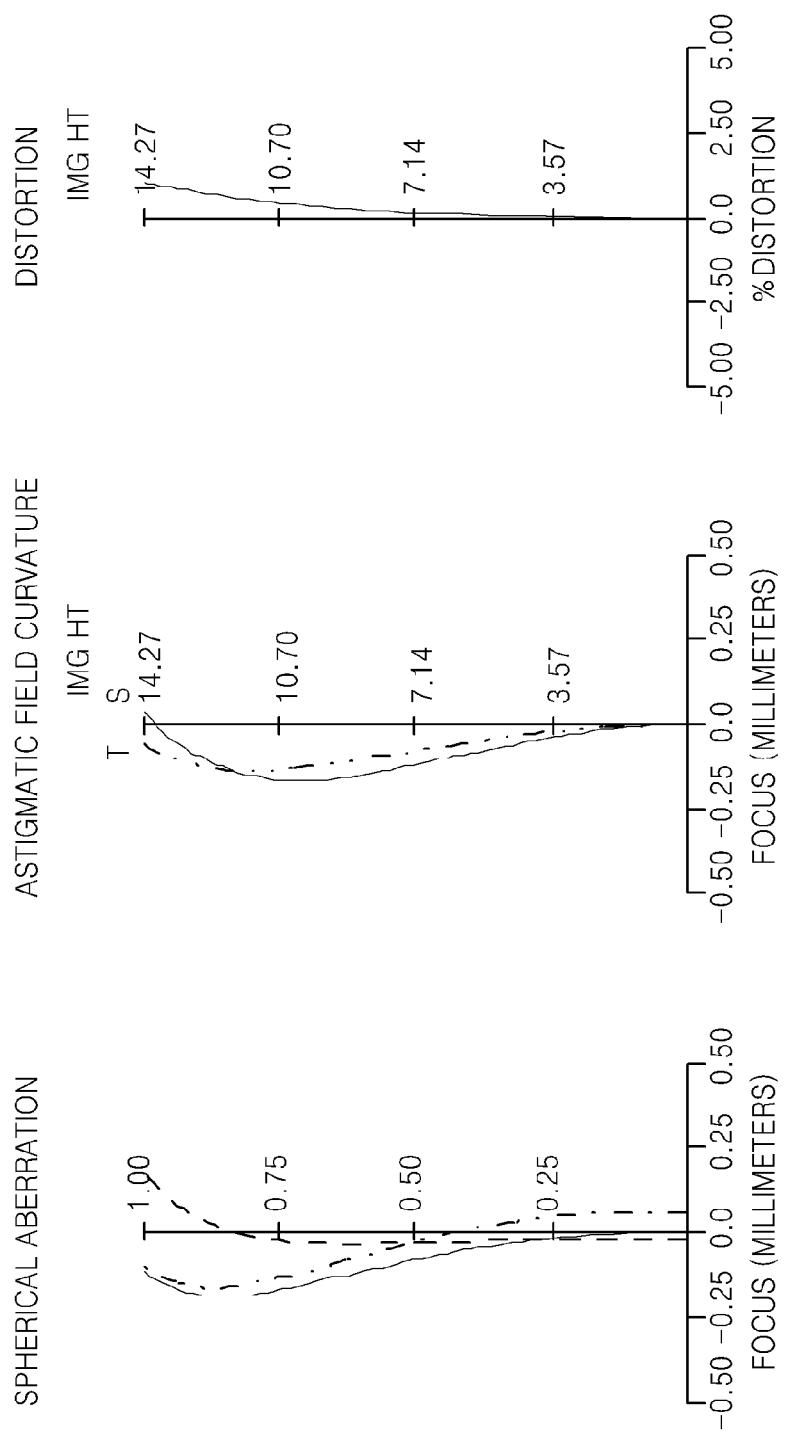
FIG. 12 shows longitudinal aberration graphs of the wide angle lens system of FIG. 10 at a short distance, according to the fourth embodiment.

FIG. 11 shows longitudinal spherical aberration, field curvature, and distortion of the wide angle lens system 100-4 at an infinite object distance, according to the fourth embodiment. FIG. 12 shows longitudinal spherical aberration, field curvature, and distortion of the wide angle lens system 100-4 at a short distance, according to the fourth embodiment.

<Fifth Embodiment>

Figure 13:
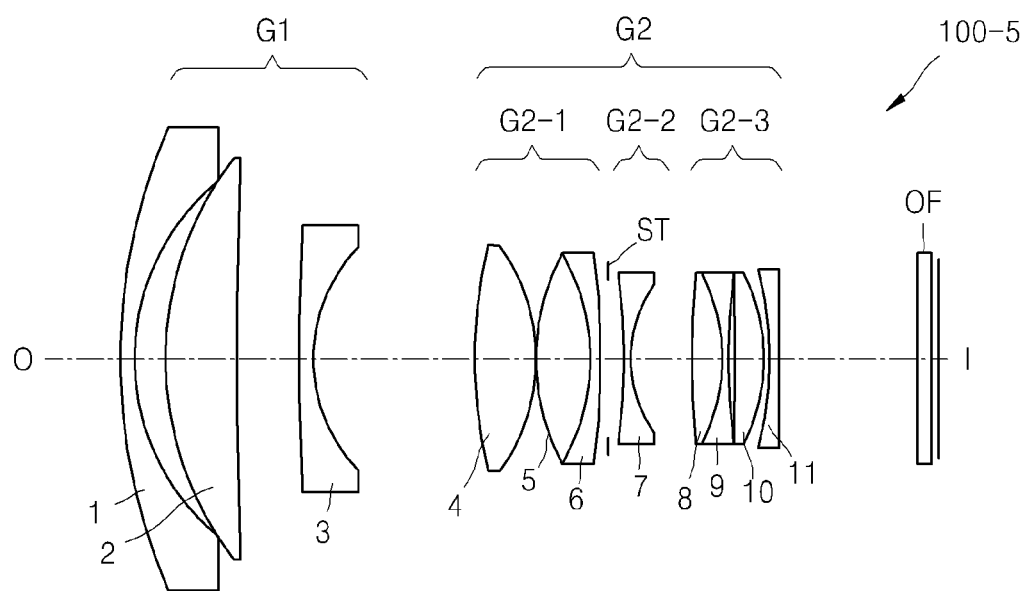
FIG. 13 is a cross-sectional view of a wide angle lens system, according to a fifth embodiment.

FIG. 13 is a cross-sectional view of a wide angle lens system 100-5, according to a fifth embodiment. Table 17 shows design data of the fifth embodiment.

EFL=24.612, FNO=1.44, and w=30.6°

TABLE 17

| Lens Surface | R | TH | Nd | Vd |
|---|---|---|---|---|
| S1 | 69.906 | 2.000 | 1.62299 | 61.1 |
| S2 | 31.872 | 4.823 | 1.00000 | 0.0 |
| S3 | 46.112 | 8.262 | 1.84666 | 24.9 |
| S4 | 533.307 | 10.343 | 1.00000 | 0.0 |
| S5 | 249.778 | 1.600 | 1.73077 | 42.5 |
| S6 | 17.895 | 23.335 | 1.00000 | 0.0 |
| S7 | 54.271 | 8.511 | 1.60602 | 60.4 |
| S8 | −29.515 | 0.100 | 1.00000 | 0.0 |
| S9 | 33.455 | 7.482 | 1.59282 | 72.1 |
| S10 | −32.253 | 1.600 | 1.92286 | 21.8 |
| S11 | −114.663 | 1.012 | 1.00000 | 0.0 |
| S12 | Infinity | 2.030 | 1.00000 | 0.0 |
| S13 | −229.438 | 1.200 | 1.59551 | 41.1 |
| S14 | 19.424 | 8.568 | 1.00000 | 0.0 |
| S15 | 127.907 | 4.000 | 1.91082 | 37.0 |
| S16 | −26.310 | 1.000 | 1.56732 | 44.9 |
| S17 | 109.873 | 0.786 | 1.00000 | 0.0 |
| S18 | −1196.642 | 3.757 | 1.80470 | 43.0 |
| S19 | −29.572 | 0.765 | 1.00000 | 0.0 |
| S20 | −52.097 | 1.400 | 1.58144 | 42.9 |
| S21 | 6204.991 | 19.723 | 1.00000 | 0.0 |
| S22 | Infinity | 2.000 | 1.51680 | 67.5 |
| S23 | Infinity | 0.500 | 1.00000 | 0.0 |

Table 18 shows aspherical coefficients in the fifth embodiment.

TABLE 18

| Lens Surface | K | a | b |
|---|---|---|---|
| S7 | −1.0000 | −5.35397e−006 | 0.00000e+000 |
| S13 | −1.0000 | −4.17120e−006 | 0.00000e+000 |
| S18 | −1.0000 | −9.43807e−006 | 2.07285e−008 |

Table 3 shows variable distances between lenses when focusing is performed at the shortest distance in the fifth embodiment.

TABLE 19

| MAG | 0.24348 |
|---|---|
| TH(S0) | 70.000 |
| TH(S12) | 6.570 |
| TH(S14) | 4.027 |
| TH(S23) | 0.500 |

Table 20 shows the focal length $f_1$ of the first lens group G1, the focal length $f_2$ of the second lens group G2, and the focal length $f_{2\text{-}2}$ of the 2-2 lens group G2-2 in the fifth embodiment, which are values used in Inequalities 1 and 2.

TABLE 20

| $f_1$ | −36.083 |
|---|---|
| $f_2$ | 29.800 |
| $f_{2\text{-}2}$ | −30.017 |
| $f_2/f_{2\text{-}2}$ | −0.993 |
| $f/f_1$ | −0.682 |

Figure 14:
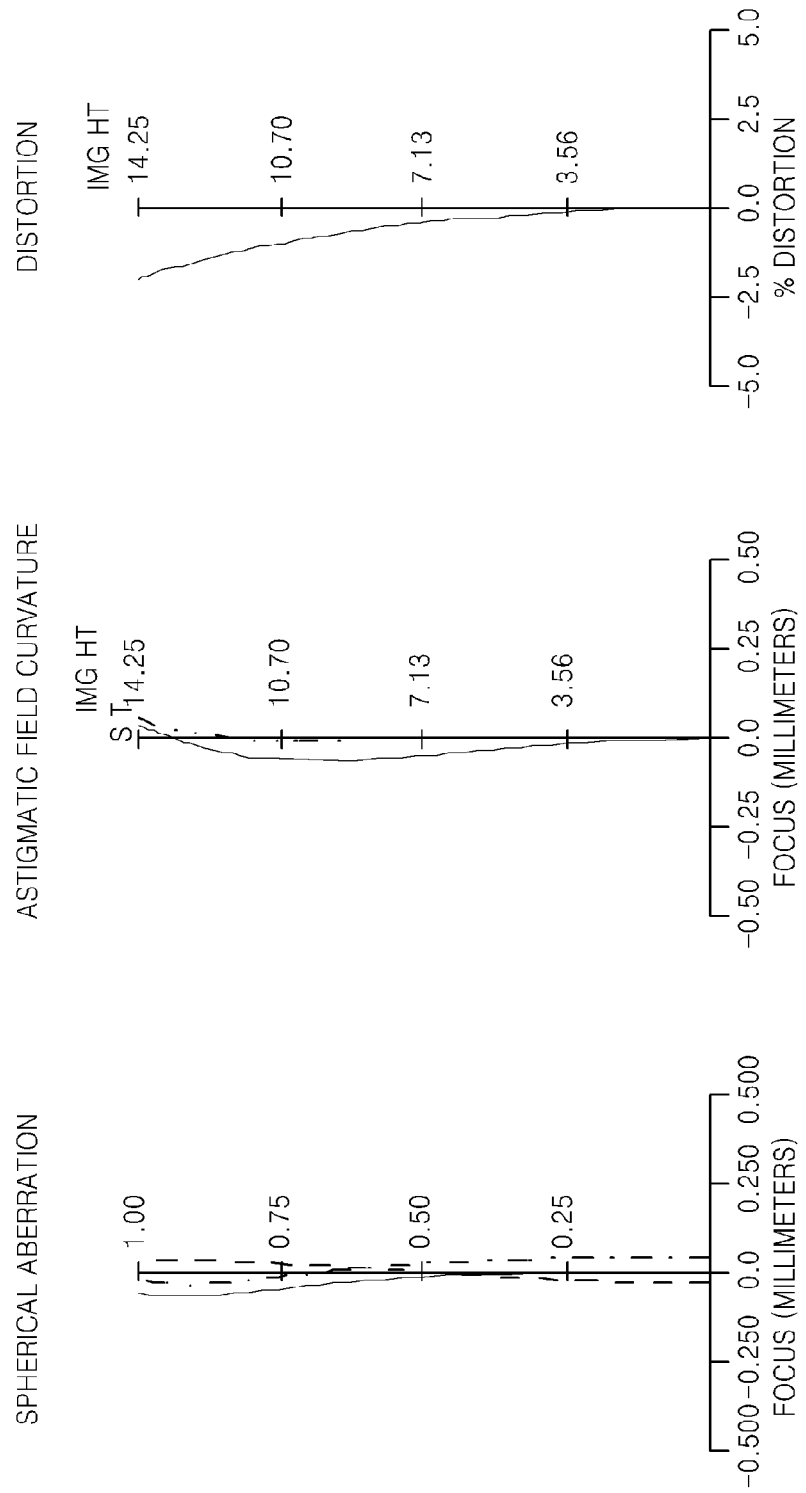
FIG. 14 shows longitudinal aberration graphs of the wide angle lens system of FIG. 13 at an infinite object distance, according to the fifth embodiment.
Figure 15:
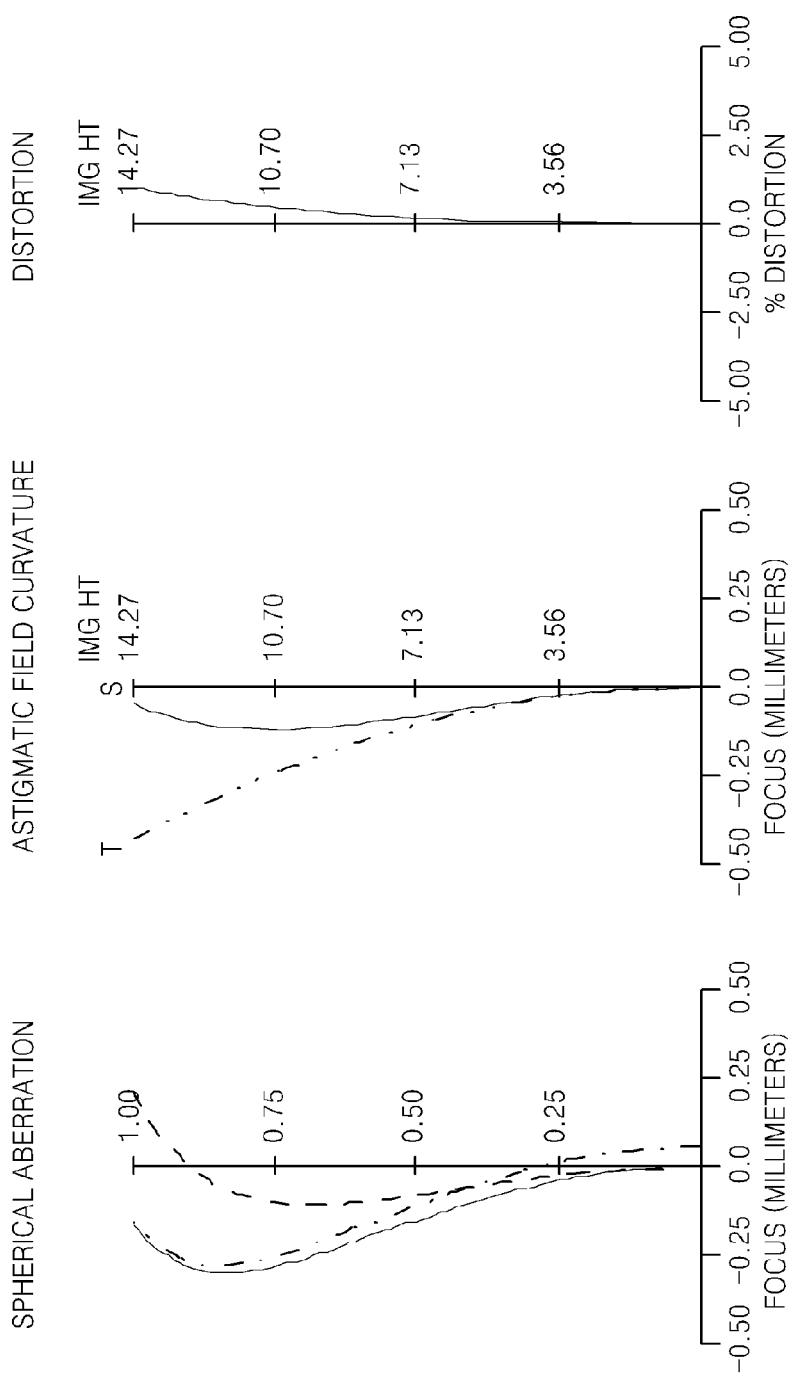
FIG. 15 shows longitudinal aberration graphs of the wide angle lens system of FIG. 13 at a short distance, according to the fifth embodiment.

FIG. 14 shows longitudinal spherical aberration, field curvature, and distortion of the wide angle lens system 100-5 at an infinite object distance, according to the fifth embodiment. FIG. 15 shows longitudinal spherical aberration, field curvature, and distortion of the wide angle lens system 100-5 at a short distance, according to the fifth embodiment.

As described above, a wide angle lens system according to an embodiment may be appropriately applied to still cameras, video cameras, and other electronic apparatus having image capturing capabilities, is a so-called retrofocus type, and employs an inner focusing method. Also, the wide angle lens system is a bright lens system having an F number equal to or less than about 1.8.

Figure 16:
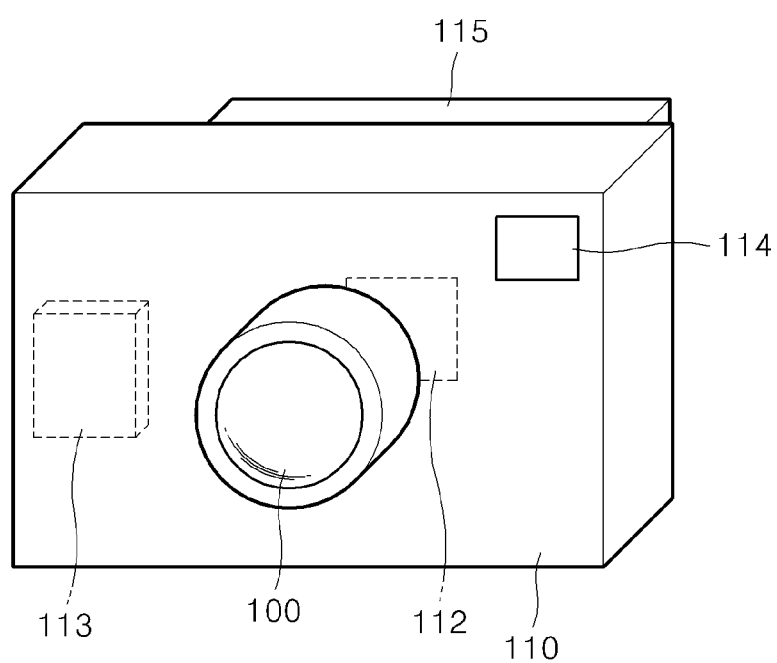
FIG. 16 is a perspective view of an electronic apparatus, according to an embodiment.

FIG. 16 is a perspective view of an electronic apparatus (e.g., a photographing apparatus) including a wide angle lens system 100, according to an embodiment. The photographing apparatus includes a housing 110. The wide angle lens system 100 may be one of the wide angle lens systems 100-1, 100-2, 100-3, 100-4, and 100-5 described above in the previous embodiments. The wide angle lens system 100 may be mounted on the housing 110. The photographing apparatus includes an imaging device 112 for receiving light that has passed through the wide angle lens system 100. The photographing apparatus may include a recording unit 113 for recording information photoelectrically transformed by the imaging device 112 and corresponding to a subject image, and a view finder 114 for viewing the subject image. Also, the photographing apparatus may include a display unit 115 for displaying the subject image. Although the view finder 114 and the display unit 115 are separately included in FIG. 16, only a display unit may be included without a view finder. The photographing apparatus illustrated in FIG. 16 is merely provided as an example, is not limited to a camera, and may also be various other optical devices or electronic devices having image capturing capabilities. As described above, by applying a wide angle lens system according to an embodiment to an electronic apparatus such as a digital camera, an electronic apparatus capable of rapidly performing auto focusing may be achieved.

In an electronic apparatus (e.g., a photographing apparatus) using an imaging device such as a charge coupled device (CCD) or a complementary metal-oxide semiconductor (CMOS) device, a contrast auto focusing method for performing focusing to a maximum contrast position based on a contrast signal from the imaging device may be used. In this method, since an image should be checked after the maximum contrast position and then a focus lens group should move back to perform focusing, the focus lens group should move rapidly and accurately. Accordingly, in an electronic apparatus employing the contrast auto focusing method, rapid and accurate focusing may be performed by forming the focus lens group to be lightweight. Also, an electronic apparatus according to an embodiment may employ an active method for performing focusing by irradiating light and measuring a distance by using reflected light, or a phase difference detection method requiring a phase difference of light on different portions of an entrance pupil of a lens, as an auto focusing method.

A wide angle lens system according to an embodiment may have a small size by employing an inner focusing method. As described above, by using an inner focusing method to perform focusing by moving some lenses inside the wide angle lens system, the wide angle lens system may be reduced in size and weight, and thus, be more convenient to carry.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While various embodiments have been particularly shown and described, it will be understood by those of ordinary skill in the art that various changes in form and details may be made therein without departing from the spirit and scope of the invention as defined by the following claims.

What is claimed is:

1. A wide angle lens system comprising:
a first lens group having a negative refractive power; and
a second lens group having a positive refractive power and being spaced apart from the first lens group by a maximum air gap,
wherein the first lens group and the second lens group are sequentially arranged from an object side toward an image side,
wherein the second lens group comprises a positive 2-1 lens group, a negative 2-2 lens group, and a positive 2-3 lens group, and
wherein focusing is performed by moving the 2-2 lens group along an optical axis.

2. The wide angle lens system of claim 1, wherein an aperture stop is disposed between the 2-1 lens group and the 2-2 lens group.

3. The wide angle lens system of claim 1, wherein the 2-2 lens group comprises a doublet lens or a single lens.

4. The wide angle lens system of claim 1, wherein the 2-1 lens group comprises a lens having at least one aspherical surface.

5. The wide angle lens system of claim 1, wherein the 2-3 lens group comprises a lens having at least one aspherical surface.

6. The wide angle lens system of claim 1, wherein the 2-3 lens group comprises a negative lens and a positive lens sequentially arranged from the image side.

7. The wide angle lens system of claim 1, wherein the first lens group comprises a negative meniscus lens, a positive lens, and a negative lens sequentially arranged from the object side.

8. The wide angle lens system of claim 1, wherein the 2-1 lens group comprises a positive lens, and a doublet lens having a positive lens and a negative lens.

9. The wide angle lens system of claim 1, wherein the wide angle lens system satisfies the following inequality:

$$-0.20 < f_2/f_{2-2} < -4.50,  \qquad \text{<Inequality>}$$

wherein $f_2$ denotes a focal length of the second lens group, and $f_{2-2}$ indicates a focal length of the 2-2 lens group.

10. The wide angle lens system of claim 1, wherein the wide angle lens system satisfies the following inequality $$-0.15 < f/f_1 < -2.10,  \qquad \text{<Inequality>}$$

wherein f denotes a focal length of the wide angle lens system at an infinite object distance, and $f_1$ indicates a focal length of the first lens group.

11. The wide angle lens system of claim 1, wherein the wide angle lens system has an F number equal to or less than 1.8.

12. An electronic apparatus comprising:
a wide angle lens system; and
an imaging device that receives light imaged by the wide angle lens system,
wherein the wide angle lens system comprises:
　a first lens group having a negative refractive power; and
　a second lens group having a positive refractive power and being spaced apart from the first lens group by a maximum air gap,
　wherein the first lens group and the second lens group are sequentially arranged from an object side toward an image side,
　wherein the second lens group comprises a positive 2-1 lens group, a negative 2-2 lens group, and a positive 2-3 lens group, and
　wherein focusing is performed by moving the 2-2 lens group along an optical axis.

13. The electronic apparatus of claim 12, wherein an aperture stop is disposed between the 2-1 lens group and the 2-2 lens group.

14. The electronic apparatus of claim 12, wherein the 2-2 lens group comprises a doublet lens or a single lens.

15. The electronic apparatus of claim 12, wherein the 2-1 lens group comprises a lens having at least one aspherical surface.

* * * * *